United States Patent
Ofek et al.

(10) Patent No.: US 7,852,315 B2
(45) Date of Patent: Dec. 14, 2010

(54) CAMERA AND ACCELERATION BASED INTERFACE FOR PRESENTATIONS

(75) Inventors: Eyal Ofek, Beijing (CN); Feng-Hsiung Hsu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 783 days.

(21) Appl. No.: 11/278,998

(22) Filed: Apr. 7, 2006

(65) Prior Publication Data
US 2007/0236451 A1 Oct. 11, 2007

(51) Int. Cl.
G06F 3/033 (2006.01)
G09G 5/08 (2006.01)

(52) U.S. Cl. ........................ 345/157; 345/158
(58) Field of Classification Search ......... 345/156–168, 345/8
See application file for complete search history.

(56) References Cited

U.S. PATENT DOCUMENTS

| | | | | |
|---|---|---|---|---|
| 7,154,477 | B1* | 12/2006 | Hotelling et al. | 345/166 |
| 7,161,596 | B2* | 1/2007 | Hoile | 345/427 |
| 7,365,735 | B2* | 4/2008 | Reinhardt et al. | 345/156 |
| 7,379,063 | B2* | 5/2008 | Hoff | 345/427 |
| 2001/0010514 | A1 | 8/2001 | Ishino | |
| 2002/0089489 | A1* | 7/2002 | Carpenter | 345/158 |
| 2002/0130838 | A1* | 9/2002 | Feierbach | 345/157 |
| 2004/0136083 | A1* | 7/2004 | Wang et al. | 359/642 |
| 2006/0001645 | A1* | 1/2006 | Drucker et al. | 345/156 |
| 2006/0092178 | A1* | 5/2006 | Tanguay et al. | 345/629 |
| 2006/0139327 | A1* | 6/2006 | Dawson et al. | 345/158 |
| 2006/0146015 | A1* | 7/2006 | Buchmann | 345/156 |
| 2007/0013657 | A1* | 1/2007 | Banning | 345/157 |
| 2009/0179841 | A1* | 7/2009 | Visser | 345/88 |

OTHER PUBLICATIONS

Lucas, et al, "An Iterative Image Registration Technique with an Application to Stereo Vision", Proceedings of Imaging Understanding Workshop,1981, pp. 121-130.
Shi, et al., "Good Features to Track", IEEE, Jun. 21-23, 1994, pp. 8.
Tomasi, et al., "Detection and Tracking of Point Features", Apr. 1991, pp. 37.

* cited by examiner

Primary Examiner—Chanh Nguyen
Assistant Examiner—Kwang-Su Yang
(74) Attorney, Agent, or Firm—Lee & Hayes, PLLC

(57) ABSTRACT

Systems and methods for a camera and acceleration based interface for presentations are described. In one aspect, a handheld device is utilized capture optical information. The optical information is then used to identify the location of a cursor that is presented on a display surface. While a user moves the handheld device, inertial information corresponding to the movement is accumulated on the handheld device. The optical and accumulated inertial information is used to modify position of the cursor with respect to the display surface.

19 Claims, 4 Drawing Sheets

CAMERA AND ACCELERATION BASED INTERFACE FOR PRESENTATIONS

BACKGROUND

Projectors coupled to computers running presentation software are increasingly being used to present and convey ideas. A user typically relies on a mouse that is operated on a flat surface or other handheld device to control cursor position with respect to a presentation and control the presentation. The ability of a wireless handheld device that need not be operated on a flat surface to control cursor position over a presentation typically depends on whether camera optics in the handheld device can reliably capture cursor position on the screen to make accurate cursor position measurements. In scenarios where the handheld is moved rapidly or tilted at certain angles with respect to the on-screen presentation, the handheld's on-board camera optics may not be able to capture the displayed cursor position, or may only be able to acquire limited amounts of cursor positional information. As a result, the user may not be able to use the remotely coupled handheld device to reliably control cursor position on the presentation.

SUMMARY

Systems and methods for a camera and acceleration based interface for presentations are described. In one aspect, a handheld device is utilized capture optical information. The optical information is then used to identify the location of a cursor that is presented on a display surface. While a user moves the handheld device, inertial information corresponding to the movement is accumulated on the handheld device. The optical and accumulated inertial information is used to modify position of the cursor with respect to the display surface.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Figure 1:
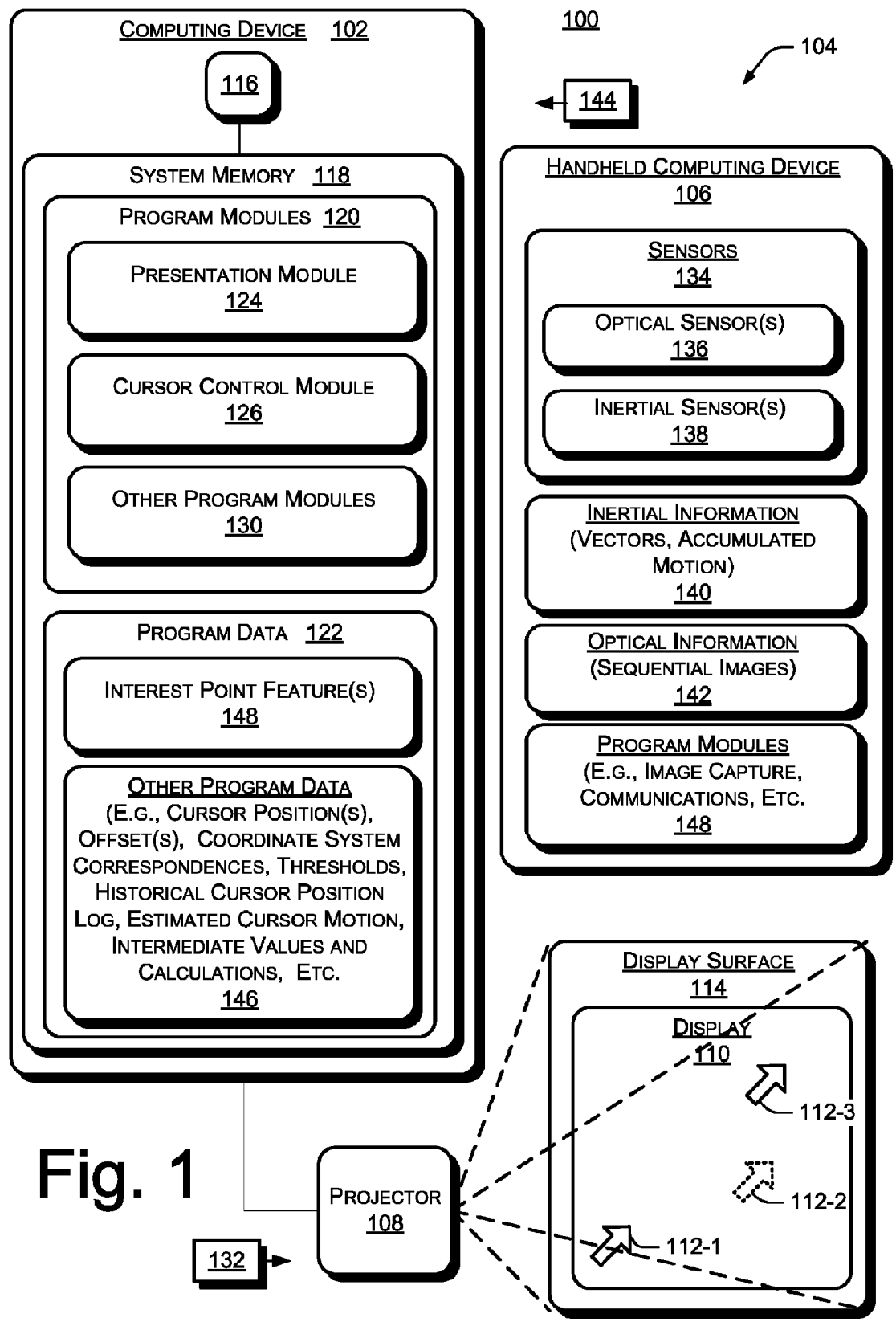
FIG. 1 illustrates an exemplary system for camera and acceleration based interface for presentations such as an on-screen presentation, according to an embodiment.

Systems and methods for camera and acceleration based interfaces to large-screen applications are described. The systems and methods allow a user to display and control cursor position on a presentation by using a handheld device that interfaces with an application executing on a remote computing device. More particularly, the systems and methods display a stylized cursor over a presentation (using any one of a number of different possible cursor presentation techniques) at an initial cursor position. As the user moves the handheld device relative to the screen, the handheld and the application maintain a feedback loop, wherein the handheld captures optical information (e.g., image frames taken at periodic intervals) and accumulates inertial information (i.e., acceleration vectors). The handheld transfers that information to the application. The application evaluates at least a subset of the transferred information to identify the position of the displayed cursor in a frame, and determine relative movement of the handheld with respect to the presentation (via one or more of the optical and inertial information). For this information, one or more new cursor positions for display over the presentation are calculated.

For example, in the absence of fast handheld device movements, when a user activates and points optical sensors of the handheld towards a screen/display surface, a cursor control application uses the optical sensor information to locate cursor position. From this cursor position, the application establishes a set of real-time coordinate correspondences/mappings between the optical sensor(s) and the display surface. One or more new cursor positions are then calculated in view of these mappings and optical sensor based detected motion of the handheld relative to a presentation. In one implementation, if the initial or current position of the displayed cursor cannot be determined in view of the transferred optical information, the application directs presentation software to display the cursor at one or more different screen positions until the cursor control application detects the cursor position from the handheld captured optical information transferred to the application. At this point, subsequently received optical information is used by the application to calculate one or more new cursor positions in view of the known cursor position and handheld motion (e.g., panning motions relative to the presentation).

When the optical sensors are not pointing towards the screen, and/or in the presence of fast handheld motions that prevent reliable optical tracking of the cursor, the cursor control application utilizes at least the accumulated motion of the handheld as indicated by the accumulated inertial information. In one implementation, and in this scenario, the optical sensor information is also used to move the displayed cursor from an initial/current position to a new position. For example, when the application has determined the coordinate system correspondences between the handheld and the display surface, the application utilizes accumulated motion by itself to determine and control cursor position. Additionally, when the application has not determined the correspondence between the optical sensor and screen coordinate systems, the application uses both the accumulated motion and the optical sensor information to correct any error in the accumulated handheld motion and identify and control cursor position.

These and other aspects of the systems and methods for camera and acceleration based interfaces for presentations are now described in greater detail.

An Exemplary System

Although not required, the systems and methods for camera and acceleration based interface to on-screen presentations are described in the general context of computer-executable instructions (program modules) being executed by computing devices such as a general purpose computer and a mobile handheld device. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 illustrates an exemplary system 100 for camera and acceleration based interface for presentations such as an on-screen presentation, according to an embodiment. In this implementation, system 100 includes general purpose computing device 102 coupled over network 104 to handheld computing device 106. General purpose computing device 102 is any type of computing device such as a personal computer, a laptop, a server, and/or so on. Handheld computing device ("handheld") 106 is a small form factor mobile computing device such as, for example, a mobile smart phone, a personal digital assistant (PDA), etc. Network 104 may include any combination of a local area network (LAN) and a general wide area network (WAN) communication environments, such as those which are common place in offices, enterprise-wide computer networks, intranets, and the Internet. In this implementation, network 104 includes a wireless network, for example, a Bluetooth® or WiFi network operating as a communications path between general computing device 102 and handheld computing device 106.

Computing device 102 is also coupled to a projector 108 for displaying a display 110 and a stylized cursor 112 onto a display surface 114. As discussed below, a user interfaces with the handheld 106, which in turn interfaces with the computing device 102, to control position of cursor 112 with respect to the display 110 displayed on surface 114. Computing device 102 is coupled to projector 108 with any type of connection mechanism, for example, over network 104 or via a cable such as a VGA cable, and/or so on. Display surface 114 represents any type of display surface, for example, a TV screen, a fabric or other display surface (e.g., a wall), a plasma screen in a show window, an electronic billboard, etc.

Each of the computing devices 102 and 106 include one or more respective processors coupled to a system memory that includes program modules and program data. The respective processors are configured to fetch and execute computer-program instructions from the program modules. For example, general-purpose computer 102 includes one or more processors 116 coupled to system memory 118. The system memory 118 includes program modules 120 and program data 122. The one or more processors 116 are configured to fetch and execute computer-program instructions from respective ones of program modules 120. Program modules 120 include, for example, presentation module 124 to display the display 110 onto display surface 114, cursor control module 126 to identify and control position of the cursor 112 with respect to display 110, and other program modules 130 such as an operating system, device drivers, etc.

Presentation module 124 selectively communicates presentation data 132 to projector 108. Presentation data 132 includes data associated with a slideshow presentation, a television, DVD, VCR, Tivo®, interactive graphic data such as menus or a game, or other type of presentation. Projector 108 projects or otherwise displays presentation data 132 onto display surface 114. For purposes of exemplary discussion, displayed presentation data 132 is shown as a display 110. Presentation module 124 displays a stylized cursor 112 (or other user interface selection control/object) on display surface 114 according to direction provided by cursor control module 126. Although system 100 shows presentation module 124 as a different computer-program module than cursor control module 126, such implementation is arbitrary and a function of the particular architecture of system 100. For example, in one implementation, the respective logic of these modules 124 and 126 is implemented in a single computer-program module.

A user interfaces with handheld 106 to control position of the cursor 112 over the display 110, and optionally control operation of the display 110 (e.g., cursor positioning can also be used for referencing purposes). Cursor positional control is accomplished by panning handheld 106 relative to display 110. Such panning includes, for example, a user making up, down, left, right, and/or diagonal panning motions with handheld 106. In one implementation, for example, if the user tilts handheld device 106 forward (e.g., up), cursor control application ("cursor control") 126 moves cursor 112 up relative to display 110. If the user tilts handheld device laterally (e.g., left or right), cursor control 126 moves cursor 112 in a corresponding lateral direction relative to display 110. For purposes of exemplary illustration, cursor 112 is shown in several respective positions 112-1 through 112-3 to illustrate that a user utilizes handheld 106 to control movement of cursor 112 relative to display 110. In this example, cursor position 112-1 represents an initial position, cursor position 112-2 represents an intermediate (new) cursor position, and cursor position 112-3 represents a subsequent new cursor position. As such, handheld 106 functions as a virtual laser pointer based on its orientation relative to the display 110 (or display surface 114).

A user interfaces with handheld 106 to operationally control display 110 by selecting an object underneath a hotspot associated with a displayed cursor 112. The particular type of object being selected is arbitrary and can be any type of user interface control such as a button, scroll bar, menu, menu item, and/or so on. Operational control includes, for example, operations to show a next or previous slide, page up, page down, menu item selection, and/or other operations. To this end, handheld 106 is equipped with a set of sensors 134.

In one implementation, sensor(s) 134 include optical sensor(s) 136 and inertial sensor(s) 138. In this implementation, for example, optical sensor(s) 136 represent an on-board camera or video component. In this implementation, inertial sensor(s) 138 represent one or more on-board accelerometers. As a user interfaces with the handheld 106 (e.g., via a button pressed or some other action such as voice activation, etc.), the handheld device 106 accumulates inertial information 140 from inertial sensor(s) 138 and intermittently captures optical information 142 from optical sensor(s) 136. Inertial information 140 represents acceleration vectors indicating the accumulated motion of the handheld device 106 as a user moves the handheld device 106. The optical information 142 represents a set of sequential images (e.g., snapshots of display 110) that are taken by the handheld 106 using the optical sensor(s) 136 at configurable periodic time intervals. Each sequential image, from the perspective of the location of handheld 106 to the presentation, represents a static image of display 110. In one implementation, image frames are low resolution image frames.

As the inertial information 140 and optical information 142 is respectively accumulated and captured, handheld 106 transfers the information 140 and 142 to cursor control module ("control module") 126. For purposes of exemplary illustration, the transferred information is shown as transferred information 144. Control module 126 evaluates this transferred information 144 to determine initial (or current) position(s) of the cursor 112 and subsequent position for the cursor 112 relative to the surface 114. Specifically, control module 126 evaluates the transferred information 144 to determine the current (initial) location of cursor 112 over display 110, and to identify a set of interest point feature(s) 148 visible in display 110 to manipulate position of cursor 112 over display 110.

For example, when the handheld's optical sensors 136 are pointing towards the display surface 114 and in the absence of fast movements using the handheld device 106, control module 126 evaluates the optical information 142 to identify the cursor 112 from a frame of image data captured by handheld 106. In one implementation, control module 126 performs such cursor identification, for example, by using cues such as specific cursor color specific cursor size and/or shape, cursor movement or animation over time (e.g. relative to static background), or a combination of such cues (e.g., a moving red arrow). For purposes of exemplary illustration, an initial position for the identified cursor 112 is shown as a respective portion of "other program data" 146. In one implementation, if control module 126 cannot identify an initial position for cursor 112 from the captured optical portions of the transferred information 144 (e.g., because the optical sensors 136 capture only part of display 110, control module 126 requests presentation module 124 to present cursor 112 in one or more different positions over display 110. This operation is repeated by presentation module 124 until the optical information transferred by handheld 106 to the capture module 126 provides enough data to enable the capture module 126 to detect the initial position of cursor 112 from a captured image frame.

In another implementation, presentation module 124 initially presents cursor 112 such that an initial cursor position can be detected from any image in optical information 142 that captures at least a portion of the area associated with display 110. This means that all captured images that represent any portion of display 110 will capture at least a portion of cursor 112. In this scenario, and responsive to control module 126 detection an initial position of the cursor 112, control module 126 directs presentation module 124 to reduce the size of cursor 112 to a default size that is smaller than the initially presented size. In one implementation, this is accomplished by systematically shrinking the cursor 112 to the default cursor size. In this exemplary scenario, control module 126 tracks the position of the shrinking cursor 112 until a particular cursor size (e.g., the default size) is achieved.

Control module 126 establishes a coordinate system mapping the relationship of the optical sensors 136 with respect to the display surface 114 based on the identified position of cursor 112. In one implementation, these correspondences are updated in real-time as control module receives information 144 transferred from the handheld 106. Control module 126 determines absolute position of the cursor 112 on display 110 in view of these correspondences. At this point, cursor control module 126 has identified location of the cursor 112. Responsive to subsequent movement by the user of handheld 104, control module 126 evaluates the resulting transferred information 144 to systematically reposition the cursor 112 on the display 110.

Figure 2:
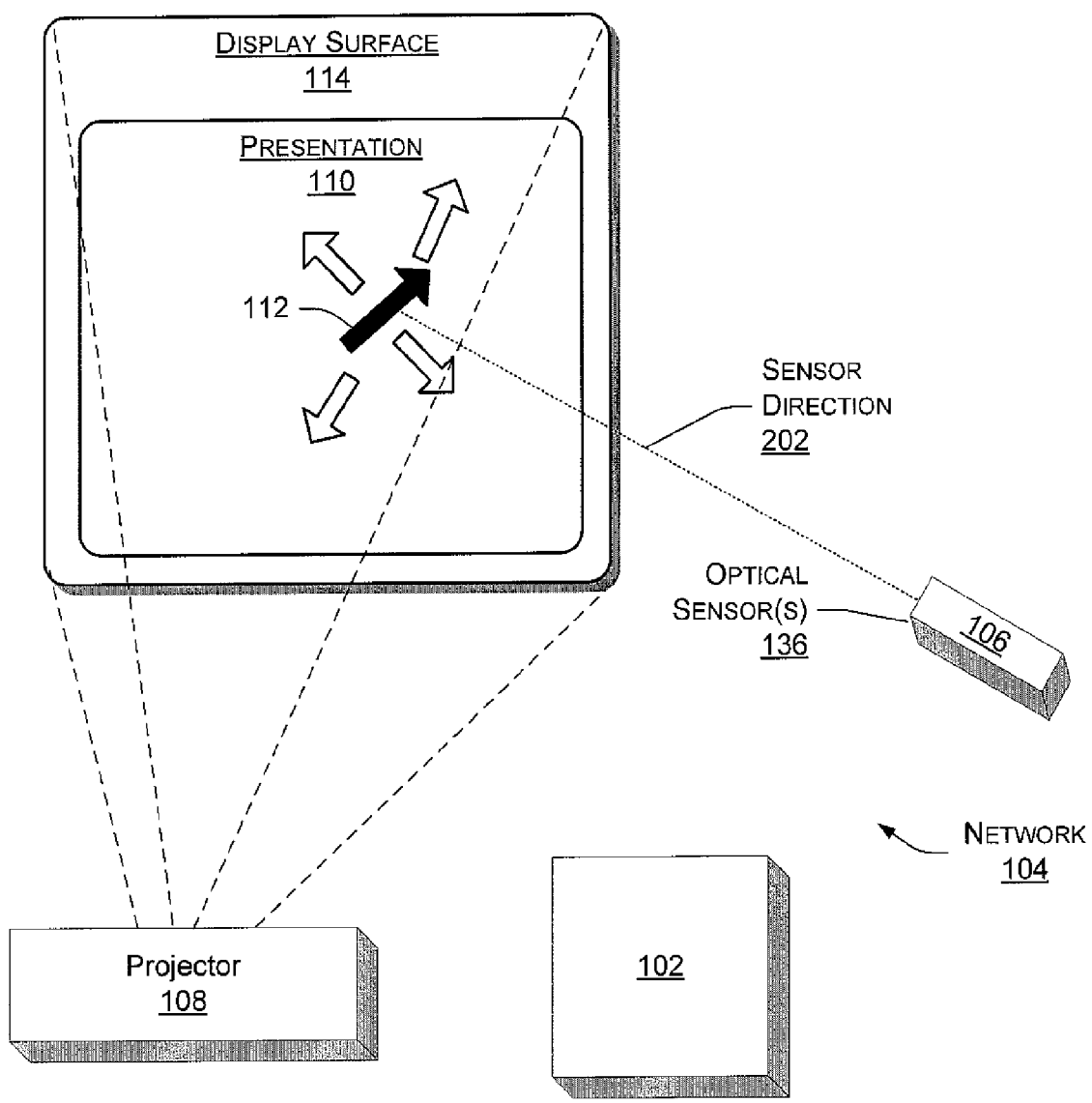
FIG. 2 shows an exemplary relative orientation of a handheld with respect to a presentation, according to one embodiment.

FIG. 2 shows an exemplary relative orientation of a handheld 106 with respect to a display 110, according to one embodiment. In the description, the left-most digit of a component reference number identifies the particular figure in which the component first appears. Line 202 represents direction of handheld sensor(s) 134. Light colored arrows surrounding dark colored cursor 112 represent directional arrows illustrating exemplary directions that handheld 106 can be used in conjunction with computing device 102 and projector 108 to render and control movement of cursor 112. Exemplary techniques for control module 112 to control position of cursor 112 on display 110 in view of the transferred information 144 (i.e., optical information 142 and inertial information 140) are now described.

Cursor Position Determinations from Optical Information

Control module 126 uses any of one or more of different control models to identify a next cursor position using optical information 142. In this implementation, such control models include use of relative motion of the handheld to the display 110, and direct manipulation to show cursor 112 in substantially the same direction where handheld 106 is aimed, although other models could also be used. The latter model does not rely on relative motion of the handheld 106 with respect to the display 110 or display surface 114, but determines an offset of cursor 112 from the center of a different captured image (i.e., a frame subsequent (e.g., subsequent and consecutive) to the one used to determine an initial cursor position). The offset is applied to the identified initial cursor position (i.e., a last known cursor position) to specify the next cursor position. Each of these models is now described in greater detail.

The relative motion model implements scale and offset transformations. In this implementation, the model is defined by the last two known cursor positions determined from the optical information 142. For example, given the last position, a new cursor position on the display 110 can be estimated by shifting from the center, by the inverse of the shift from the camera center to the detected cursor in the image. Given the two last positions of cursor 112 on the display 110 and in captured frames, the rotation and scale is estimated, for example, as follows. Let $P_i=(x_i, y_i)^t$ (i=1,2) be the position of cursor 112 in frame i (124), and let $P'_i=(x'_i, y'_i)t$ be the corresponding position of the cursor in the display 110. The transformation is defined by four unknowns, including, rotation angle, scale and offset (both in x axis and in y). Given two points, there are four equations with four unknowns. The equations are solved for a the unknowns to recover the transformation.

In this implementation, control module 126 uses the transformation to transform the center (i.e., a point where the optical sensor(s) 136 in handheld 106 were aimed) of an image from transferred optical information 142, and map the transformation to a position on the display 110. This mapped position is the new location for the cursor 112. Given longer history of cursor positions, more accurate transformations can be used. In this implementation, the affine model uses three (3) last cursor positions (six (6) unknowns in a 2×3 linear matrix) and a projective transformation (or homography) using the last four (4) cursor positions (eight (8) unknowns). For purposes of exemplary illustration, previous or historical cursor positions (as well as an initial/current cursor positions) are shown as a respective portion of "other program data" 146.

Figure 3:
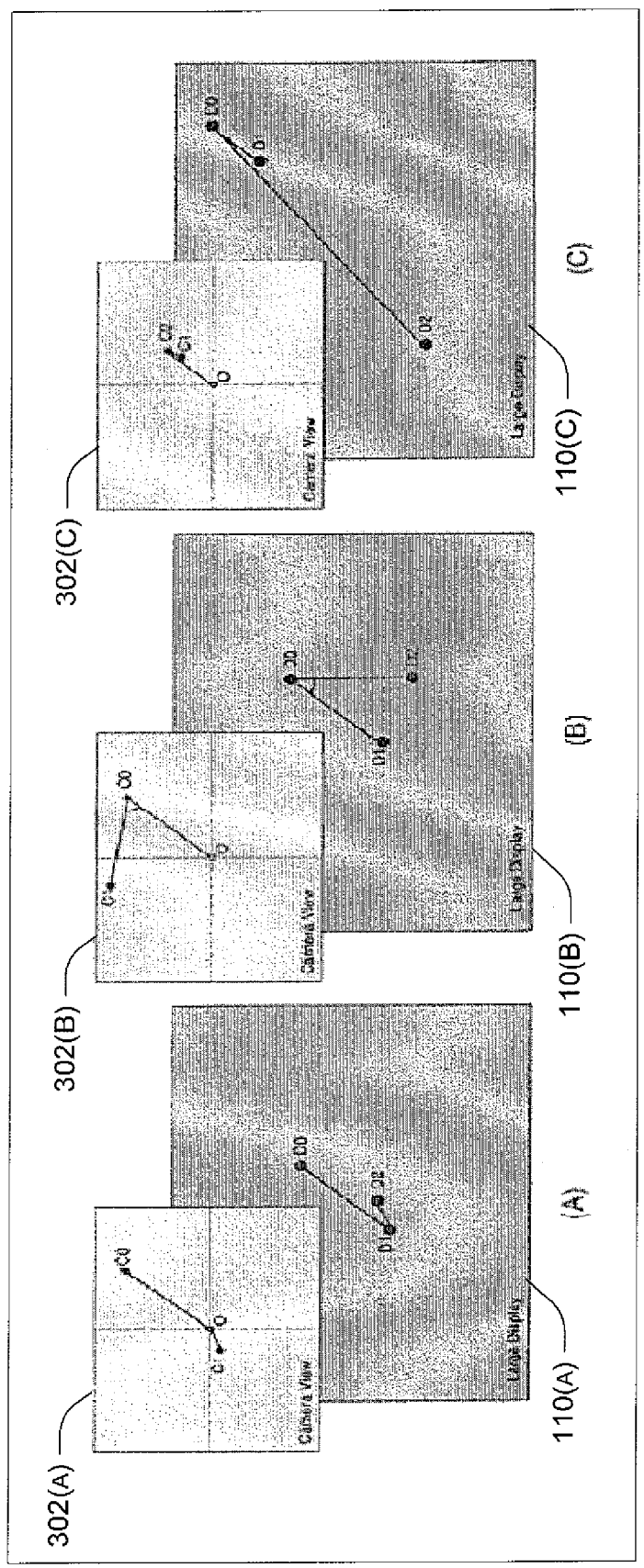
FIG. 3 shows an exemplary set of mappings to determine new cursor positions in view of a previously identified cursor position and optical sensors of a handheld, according to one embodiment.

FIG. 3 shows an exemplary set of mappings to determine new cursor positions in view of a previously identified cursor position and optical sensors 136 of a handheld 106, according to one embodiment. In FIG. 3, respective cursor positions from the perspective of the optical sensors 136 are shown within a captured image 302(A) through 302(C) as C0 and C1. Respective cursor positions from the perspective of what is displayed on to a display 110 (e.g., 100(A) through 110(C)) are represented as D0, D1 and D2. Referring to FIG. 3(A), it is seen that D1 is calculated and shown according to D0 and C0. If C1 is determined to not be moving towards the center of a captured image, control module 126 implements a shift to calculate D2. Referring to FIGS. 3(B) and (C), if C1 is determined to not be moving towards the center (FIG. 3(B)), or as having little motion ((FIG. 3(C)), capture module 126 ignores global motion of the optical sensors 136, and uses D0, C0, and D1 to estimate a scale and rotation mapping of the optical sensors 136 with respect to the display surface 114. The new cursor position D2 is calculated based on that mapping.

In view of the above, and rather than estimating the full projective (perspective) transformation between the display surface 114 (or display 110) and a captured image, control module 126 estimates very simple transformation (translation, scale, and rotation) using current and previous cursor positions. This particular implementation operates without the need for any special points in the display 110, or corners of display 114. As such, the described transformation is operational in a dark room, where display 110 and/or display 114 boundaries are not visible in an image of transferred optical information 142 that is being used to determine the new cursor position.

In this implementation, when using cursor motion as a characteristic for cursor identification, system 100 assumes that display content associated with the display 110 is static during interaction. To recognize a cursor 112 by its motion or animation, control module 126 compensates for handheld 106 (camera) global motion (i.e., motion of the optical sensors 136 caused by movement of the handheld by the user). For example, control module 126 estimates the global rotation of the handheld 106. Such rotation estimations are illustrated as a respective portion of "other program data" 146. To this end, control module 126 matches a set of interest point features 148 and/or corners of objects visible in display 110. Alternatively, control module 126: directly evaluates the transformation by minimizing differences between consecutive captured image frames (please see optical information 142) to estimate the affine or projective transformation between the consecutive frames. Control module 126 warps a last image of transferred optical information 142 onto a current such image to calculate the difference between them; the moving or animating cursor 112 is recognized as an area of large temporal difference.

Cursor Position Determinations from Inertial Information

After control module 116 has identified an initial (or current) position for cursor 112, in certain scenarios control module 126 utilizes at least the accumulated handheld motion information 140, and possibly the optical sensor information 142, to determine current position of the cursor 112 with respect to the display 110. In this implementation, such scenarios include, for example, when control module 126 determines that the optical sensors 136 in the handheld 106 are not pointing towards the display surface 114 (or display 110), and/or in the presence of fast motions of the handheld 106 (determined in view of the handheld's accumulated motion) of that prevent reliable optical tracking of the cursor 112. The optical sensors 136 are not pointing towards the display 110, for example, when control module 126 cannot identify one or more of the displayed display 110 and the display surface 114 from the captured optical information 142. Additionally, when blurry images are present in the optical information 142, control module 126 determines that the handheld 106 is being moved rapidly by the user.

For example, given a frame of optical information 142 where the cursor 112 is not detected (for example, due to large rotation that moved the cursor 112 outside the view angle, due to motion blur, etc.), the inertial data 140 is used to estimated the cursor motion. By accumulating angular accelerations from a last frame, where the cursor is visible cursor control module 125 generates an estimate of the rotation angle: from the last frame to a current frame. The new position of the cursor on the display is estimated using that angle. In one implementation, for example, the following ratio is used to determine new cursor position on display 112: rotation_angle*image_resolution/camera_view_angle, although other techniques can be used. Cursor control module 126 displays cursor 112 at the calculated new position, providing a better chance that cursor 112 will be visible in a next evaluated frame.

When control module 126 has not yet determined the correspondence between the optical sensor(s) 136 and screen coordinate systems, control module 126 uses both the accumulated motion of the handheld 106 and the optical sensor information 142 to correct any error in the accumulated handheld motion and determine a current position for the cursor 112. In one implementation, when control module 126 has already determined such coordinate system correspondences, the accumulated motion (i.e., inertial information 140) is used by itself to determine an initial cursor position 112. Control module 126 directs the projector 108, via associated presentation data 132, to render cursor 112 over display 110 at the initial position. When handheld 106 motion slows down to a threshold amount, cursor position is again tracked using the optical information 142 captured by the optical sensors 136, as described above.

An Exemplary Procedure

Figure 4:
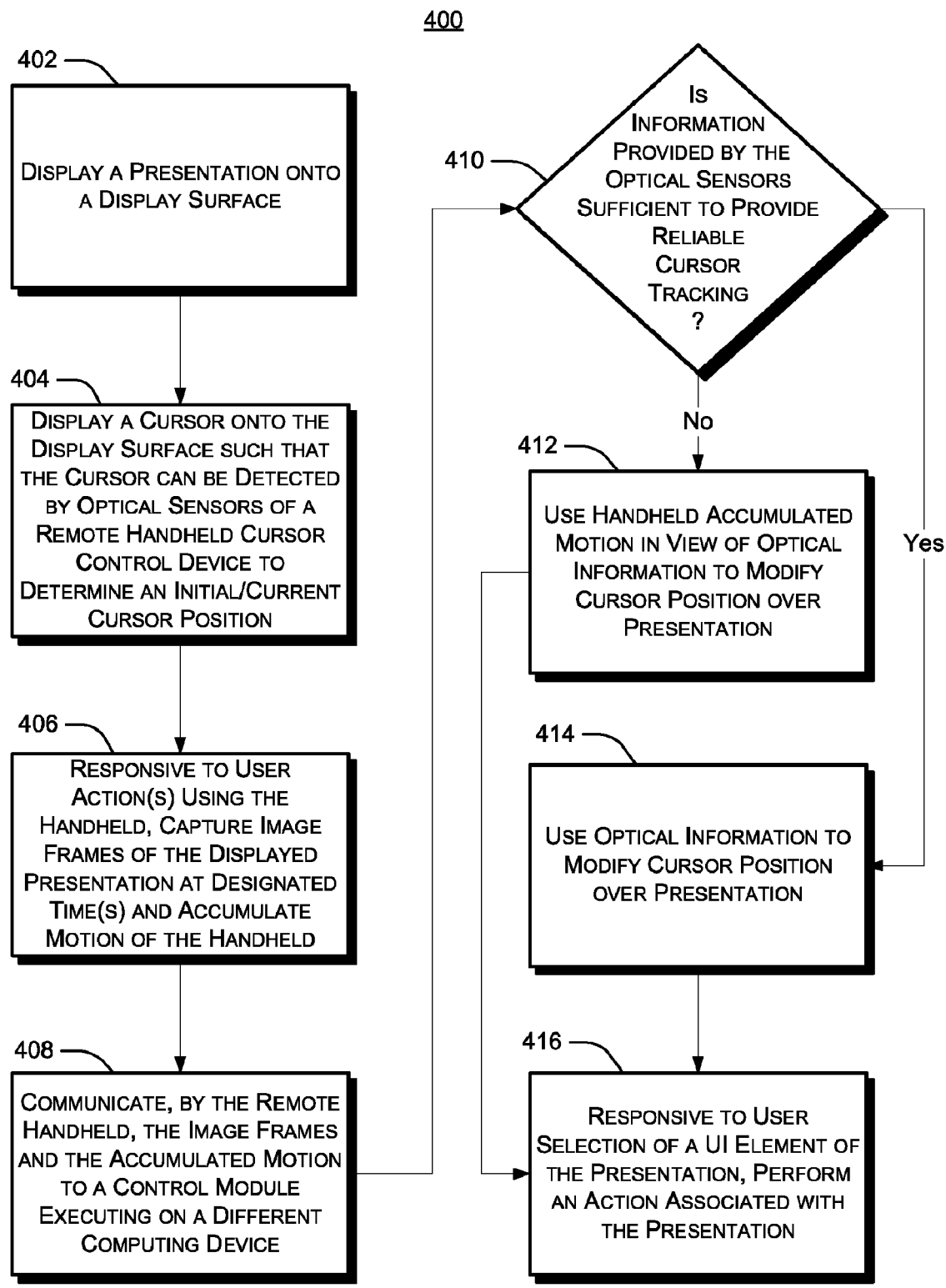
FIG. 4 shows an exemplary procedure for camera and acceleration based interface for presentations, according to one embodiment.

FIG. 4 shows an exemplary procedure for camera and acceleration based interface for presentations, according to one embodiment. For purposes of discussion the operations of FIG. 4 are described in reference to components of FIG. 1. In the description, the left-most digit of a component reference number identifies the particular figure in which the component first appears. At block 402, presentation module 124 (FIG. 1) presents display 110 onto a display surface 114. At block 404, in response to some user driven event, for example, a button pressed on the handheld device (or some other event), control module 112 directs presentation module 124 to display cursor 112 over the display 110 in such a manner that the cursor 112 can be detected by optical sensors 136 associated with the handheld 106. This allows control module 112 to determine an initial or current position of the cursor 112. In one implementation, presentation module 100 initially renders cursor 112 at a predetermined position on the display surface 114 such as in a middle, top, bottom, left, or right portion of display surface 114. In another implementation, the cursor 112 is displayed in a manner that optical sensors 136 associated with the handheld 106 can capture at least a portion of the displayed cursor 112 by taking an image of any portion of the display surface 114 or display 110.

At block 406, and responsive to user action using the handheld 106 (e.g., panning the handheld with respect to the display surface), handheld 106 captures optical information (e.g., image frames) at designated time intervals, and accumulates motion of the handheld 106. How optical sensors 136 and inertial sensors 138 are activated to respectively capture and accumulate the optical and inertial information is arbitrary. In one implementation, for example, a user begins capturing image frames by pressing a button (not shown) coupled to handheld 106. If the user maintains the button press, image control module 126 continues to accumulate optical and inertial information (and transfer the information to remote computing device 102) until the button is released. In another implementation, a first button press causes capture and accumulation of sensor information, and a second button press directs handheld 106 to cease acquiring the sensor information. In yet another implementation, for example, the user controls capture of sensor information via voice commands. In yet another implementation, for example, a gesture, such: as a circular motion, or a sharp motion, captured by the acceleration sensors serves as a trigger to start capturing the video. In view of the above, the particular technique used by handheld 106 to designate when to start and stop capturing information associated with sensors 134 is arbitrary and a function of the particular implementation of handheld 106.

At block 408, handheld 106 communicates the captured optical information and the accumulated handheld motion to control module 126. At block 410, control module 126 determines if the information provided by the optical sensors 136 is sufficient to provide reliable tracking of the cursor 112. Exemplary situations where such information may not be sufficient is when the optical sensors 136 of the handheld 106 are not pointing at the display 110 and/or when a user moves the handheld device too rapidly for the handheld 112 to accumulate enough reliable optical information to accurately control position of the cursor 112 (this latter criteria is a function of the periodic intervals at which the optical sensors capture image frames). If not, the procedure 400 continues at block 412. At block 412, control module 126 utilizes the handheld accumulated motion 140 in view of the optical information 142 to modify position of the cursor 112 with respect to the display 110. If the information provided by the optical sensors 136 is sufficient to provide reliable tracking of the cursor 112 (please see block 410), the procedure 400 continues at block 414. At block 414, control module 126 uses the optical information 142 to modify position of the cursor 112 over display 110.

At the block 416, responsive to a user utilizing the handheld 106 and cursor 112 positioning capabilities of the control module 126 to select a user interface element of the display 110, control module 126 indicates to presentation module 124 that the user interface element has been selected by the user. Responsive to such an indication, the presentation module 126 performs a corresponding action allowing the user to interface with the display 110.

Alternate Implementations

Although system 100 of FIG. 1 has been described as using projector 108 to present display 110 onto display surface 114, in one implementation such a projector 108 is not used. Instead, presentation module 124 directly displays display 110 onto a display surface 114 (e.g., a non-projection surface such as an LCD, a CRT, an electronic billboard, etc.). In another implementation, control module 126, interest point feature(s) 148 of FIG. 1, and logic used to determine position of a cursor 112 from accumulated inertial information 140 are not implemented in computing device 102, but are instead implemented on handheld 106. In this scenario, handheld 106 determines and communicates position of a cursor 112 in a captured image frame (a respective portion of optical information 142) to control module 126. In this latter implementation, handheld 106 does not communicate optical information 142 or accumulated motion. 140 to computing device 102.

CONCLUSION

Although the systems and methods for a camera and acceleration based interface to on-screen presentations have been described in language specific to structural features and/or methodological operations or actions, it is understood that the implementations defined in the appended claims are not necessarily limited to the specific features or actions described. Rather the specific features and operations are disclosed as exemplary forms of implementing the claimed subject matter.

The invention claimed is:

1. A method implemented at least in part by a computing device, the method comprising:
   without knowledge of a position of any specific point of a display surface:
      capturing, by a mobile handheld device, optical information of a cursor presented on a presentation displayed on the display surface by a remote computing device, wherein the optical information comprises two or more images;
      evaluating the optical information to minimize differences between the two or more images to estimate a projective transformation between the two or more images to identify a current position of the cursor;
      accumulating, by the mobile handheld device, inertial information comprising accumulated motion of the mobile handheld device;
      the remote computing device utilizing the optical information, the inertial information, or a combination thereof to modify a position of the cursor from the current position to a different position with respect to the presentation, the utilizing further comprising:
         determining whether the optical information is sufficient to reliably determine a new position for the cursor;
         responsive to determining that the optical information is sufficient, evaluating only the optical information to determine the new position;
         responsive to the determining that the optical information is not sufficient, evaluating the inertial information to estimate the new position by accumulating angular accelerations from a previous image of the two or more images to estimate a rotation angle to a current image of the two or more images; and
         determining the new position by a product of the rotation angle and a resolution of the current image divided by an angle of the camera.

2. The method of claim 1, further comprising obtaining an initial position of the cursor, wherein obtaining the initial position of the cursor comprises:
   presenting the cursor such that the cursor can be detected from any image in the optical information that captures at least a portion of an area associated with the display surface;
   reducing a size of the cursor from an initially presented size to a default size; and
   tracking the position of the cursor until the default size of the cursor is achieved to obtain the initial position of the cursor.

3. The method of claim 1, further comprising capturing, by one or more optical sensors, the optical information;
   wherein the two or more images comprise images of the cursor presented on the presentation; and
   wherein a difference in the two or more images is indicative of a change in position of the mobile handheld device.

4. The method of claim 1, further comprising accumulating, by an accelerometer, the inertial information;
   wherein the inertial information contains data indicative of a change in position of the mobile handheld device.

5. The method of claim 1, further comprising capturing the optical information and accumulating the inertial information responsive to an action by the user;
   wherein one or more of the optical information or the inertial information is indicative of a change in position of the mobile handheld device, wherein the change in position of the mobile handheld device is used to modify the position of the cursor.

6. The method of claim 1, wherein the operations of determining, evaluating, and considering are performed by one of the computing device or the mobile handheld device.

7. The method of claim 1, further comprising calculating the new position using a projective homography indicating a transformation between optical sensors associated with the mobile handheld device and a coordinate system associated with the presentation.

8. The method of 7, further comprising calculating the transformation based on user motions that pan the mobile handheld device with respect to the presentation.

9. A computer-readable storage medium comprising computer-program instructions that, when executed by a processor, perform acts comprising:

without knowledge of a position of any specific point of a display surface:
presenting a presentation on the display surface;
receiving by a camera optical information from a mobile handheld device of a cursor presented on the presentation displayed on the display surface by a remote computing device, wherein the optical information comprises two or more images;
evaluating the optical information to minimize differences between the two or more images to estimate a projective transformation between the two or more images to identify a current position of the cursor;
receiving accumulated inertial information comprising accumulated motion of the handheld device;
the remote computing device utilizing at least part of the optical information and the inertial information to modify a position of the cursor from the current position to a different position with respect to the presentation, the utilizing further comprising:
determining whether the optical information is sufficient to reliably determine a new position for the cursor;
responsive to determining that the optical information is sufficient, evaluating only the optical information to determine the new position;
responsive to the determining that the optical information is not sufficient, evaluating the inertial information to estimate the new position by accumulating angular accelerations from a previous image of the two or more images to estimate a rotation angle to a current image of the two or more images; and
determining the new position by a product of the rotation angle and a resolution of the current image divided by an angle of the camera,
wherein the mobile handheld device is used as one or more of a virtual laser pointer and an element for a user to control the presentation.

10. The computer-readable storage medium of claim 9, wherein a camera is used to capture the optical information including the two or more images; and
wherein the two or more images comprise images of the cursor presented on the presentation and are indicative of the change in position of the mobile handheld device.

11. The computer-readable storage medium of claim 9, wherein an accelerometer is used to accumulate the inertial information; and
wherein the inertial information contains data indicative of the change in position of the mobile handheld device.

12. The computer-readable storage medium of claim 9, wherein the presentation is a slideshow presentation.

13. The computer-readable medium of claim 9, wherein the display surface is a projection surface.

14. The computer-readable storage medium of claim 9, wherein the acts further comprise:
determining whether the optical information is sufficient to reliably determine a new position for the cursor;
responsive to determining that the optical information is sufficient, evaluating only the optical information to determine the new position; and
responsive to determining that the optical information is not sufficient, considering a combination of the inertial information and the optical information to determine the new position.

15. The computer-readable storage medium of claim 14, wherein the acts further comprise calculating the new position using a projective homography indicating a transformation between optical sensors associated with the handheld device and a coordinate system associated with the presentation.

16. A system comprising:
a remote computing device; and
a handheld computing device, wherein the handheld computing device comprises:
one or more optical sensors; and
one or more inertial sensors;
wherein the handheld computing device is configured to acquire, without knowledge of a position of any specific point of a display surface, optical and inertial information using the one or more optical sensors and the one or more inertial sensors respectively, the optical information, comprising two or more images, for use by the remote computing device to minimize differences between the two or more images to estimate a projective transformation between the two or more images to determine an initial position of a cursor on a displayed presentation;
wherein the remote computing device is configured, when the optical information is sufficient to track the cursor with respect to the displayed presentation, to use the optical information to control a position of the cursor from one or more of the initial position and subsequent cursor positions with respect to the displayed presentation; and
wherein the remote computing device is configured, when the optical information is not sufficient to track the cursor with respect to the displayed presentation, to use a combination of the optical information and the inertial information to control the position of the cursor from one or more of the initial position and subsequent cursor positions with respect to the displayed presentation and to evaluate the inertial information to estimate the subsequent cursor positions by accumulating angular accelerations from a previous image of the two or more images to estimate a rotation angle to a current image of the two or more images, the subsequent cursor positions being determined by a product of the rotation angle and a resolution of the current image divided by an angle of the camera.

17. The system of claim 16, wherein the handheld computing device comprises one of small form factor mobile computing devices comprising at least a mobile smart phone and a personal digital assistant.

18. The system of claim 16, wherein the displayed presentation is a slideshow presentation.

19. The system of claim 16, wherein the remote computing device is further configured to control the position of the cursor using a protective homography indicating a transformation between the optical information received from the handheld device and a coordinate system associated with the presentation.

* * * * *